(12) United States Patent
Meda

(10) Patent No.: US 11,634,894 B2
(45) Date of Patent: Apr. 25, 2023

(54) WATER TAPPING DEVICE AND METHODS EMPLOYED THEREOF

(71) Applicant: Divya Reddy Meda, Hyderabad (IN)

(72) Inventor: Divya Reddy Meda, Hyderabad (IN)

(73) Assignee: MARVEL BUSINESS SOLUTIONS PRIVATE LIMITED, Hyderabad (IN)

( * ) Notice: Subject to any disclaimer, the term of this patent is extended or adjusted under 35 U.S.C. 154(b) by 275 days.

(21) Appl. No.: 16/878,838

(22) Filed: May 20, 2020

(65) Prior Publication Data
US 2021/0363733 A1 Nov. 25, 2021

(51) Int. Cl.
*E03B 3/28* (2006.01)
*F04D 19/00* (2006.01)
*B01D 53/26* (2006.01)

(52) U.S. Cl.
CPC .............. *E03B 3/28* (2013.01); *B01D 53/265* (2013.01); *F04D 19/002* (2013.01)

(58) Field of Classification Search
CPC ........ E03B 3/28; B01D 53/265; F04D 19/002
USPC ....................................................... 62/119
See application file for complete search history.

(56) References Cited

U.S. PATENT DOCUMENTS

2006/0288709 A1* 12/2006 Reidy ................. F25B 21/02
62/3.4
2008/0307963 A1* 12/2008 Blum .................. B03C 3/16
95/57

* cited by examiner

*Primary Examiner* — Nael N Babaa
(74) *Attorney, Agent, or Firm* — Marvel Business Solutions Private Limited

(57) ABSTRACT

Exemplary embodiments of the present disclosure are directed towards a water tapping device for extracting water from the air in the environment comprising: a first hemisphere and a second hemisphere in an attachable and detachable manner, a first end of a cylindrical connector connected to the first hemisphere and a second end of the cylindrical connector connected to the second hemisphere respectively, air vents configured to suck air fluid and reaches the cylindrical connector comprising first rotor and second rotor configured to rotate with free air movement, gears configured to enable the first rotor and the second rotor to spin in any direction, the first rotor blades and the second rotor blades are aligned to optimize the rotation using free air movement, the air vents configured to create air pressure for condensation of pressurized air in first hemisphere and then condense pressurized air into water in second hemisphere.

14 Claims, 9 Drawing Sheets

WATER TAPPING DEVICE AND METHODS EMPLOYED THEREOF

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to a device for extracting water from the environment. More particularly, the present disclosure relates to a device and methods for extracting water from the natural air or humid ambient air present in the environment.

BACKGROUND

Supply of water is dramatically insufficient in the world. In many parts of the land, especially in arid or semi-arid regions, a significant majority of hot desert areas from the sea, at least not the whole year there is drinking water reserves. According to official estimations million people on Earth have no drinking water of sufficient quality. People die because of drinking contaminated water. Adding minerals into the water which are of benefit to the human body. There is a need to provide drinking water to people, especially in arid regions. Many methods and apparatus are also known that remove moisture from air, either to reduce humidity or generate fresh drinking water.

Air humidity is potentially a very promising source of clean water. This potential is vastly unknown, because people do not realize how immense quantities of water are contained in thin air in form of water vapor. Many attempts have been made to obtain water from air. Water in vapor form has a much higher energy content than in liquid form and its condensation is a strongly exothermic process. Recovery of water from air was attempted by cooling, air compression, and adsorption on solid adsorbents, absorption in liquid absorbents and many other methods. Conventional methods and apparatus have not succeeded in production of clean water on any significant scale for people. Those conventional methods and apparatus are expensive, complicated, huge investments into infrastructure, give low results. Conventional devices are also not compact in size.

In the light of the aforementioned discussion, there exists a need for a certain device with novel methodologies that would overcome the above-mentioned disadvantages.

SUMMARY

The following presents a simplified summary of the disclosure in order to provide a basic understanding of the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An objective of the present disclosure is directed towards generating water by condensing the natural air or humid ambient air.

Another objective of the present disclosure is directed towards a portable device.

Another objective of the present disclosure is directed towards using water for domestic, gardening, camping agricultural and industrial use.

Another objective of the present disclosure is directed towards generating mineral water.

Another objective of the present disclosure is directed towards generating water using natural energy sources like wind and solar.

According to an exemplary aspect, a device for extracting water from the air in the environment comprising of: a first hemisphere, a second hemisphere, a cylindrical connector, a first concave mirror, and a second concave mirror.

According to another exemplary aspect, the first hemisphere and the second hemisphere are in an attachable and detachable manner. The first and second hemispheres are connected to the cylindrical connector.

According to another exemplary aspect, the cylindrical connector comprises a plurality of air vents for the air to pass into the device. One end of the cylindrical connector is connected to the first hemisphere and another end of the cylindrical connector is connected to the second hemisphere.

According to another exemplary aspect, the second hemisphere acts as a reservoir configured to store the water.

According to another exemplary aspect, the device further comprises an axial rod connected to first and second rotors and in such case the rotors and the axial rod would come in pairs acting in any directions.

According to another exemplary aspect, the device further comprises gears configured to enable the first and second rotors to spin in any direction. The axial rod is hosted in the cylindrical connector that operates like a telescopic cylinders.

According to another exemplary aspect, the device further comprises lining that is configured for generating mineral water.

DETAILED DESCRIPTION OF EXAMPLE EMBODIMENTS

Figure 1:
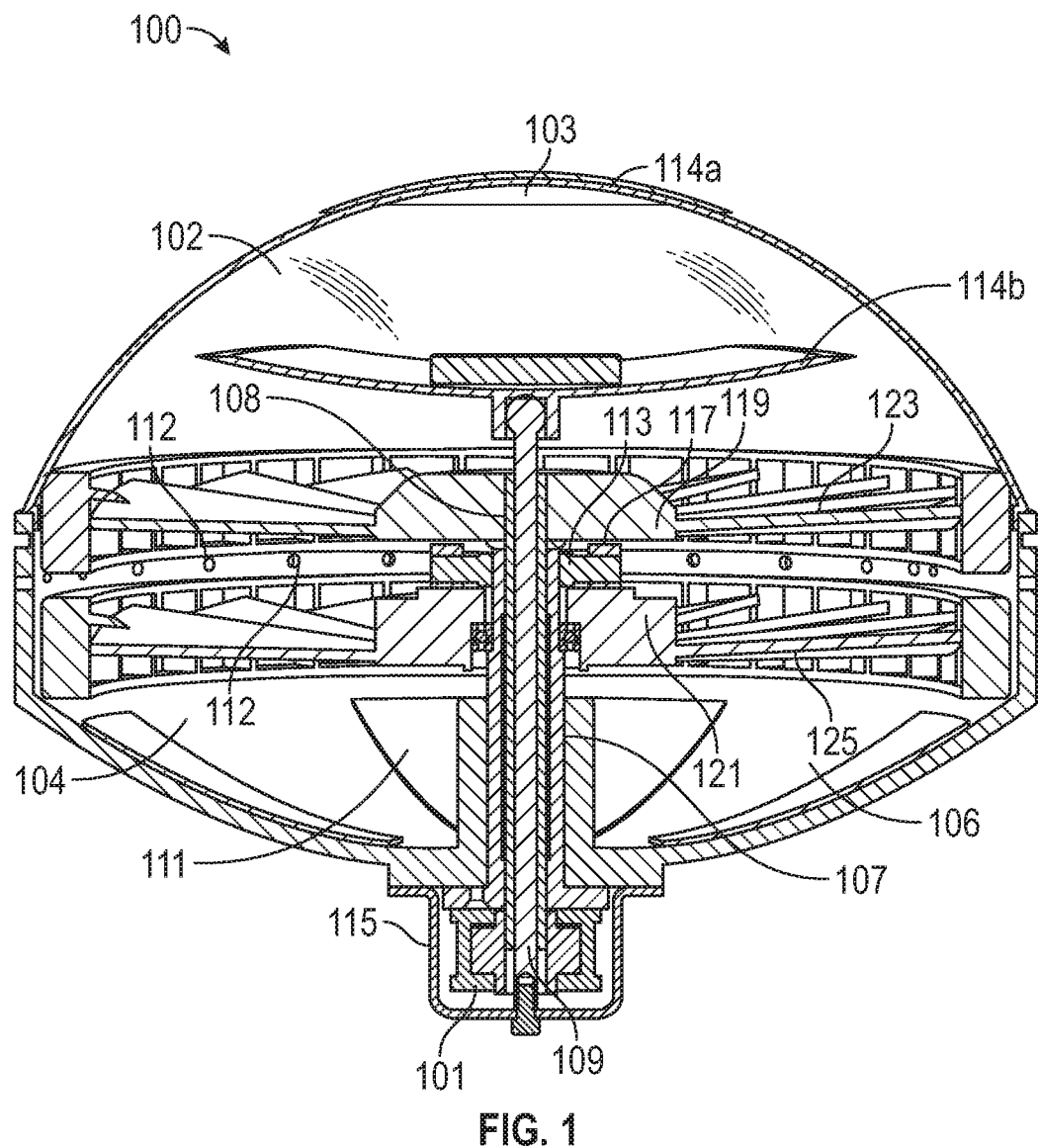
FIG. 1 is a diagram depicting a schematic representation of a cross sectional view of a water tapping device for extracting water from the natural air or humid air in the environment, in accordance with one or more exemplary embodiments.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and so forth, herein do not denote any order, quantity, or importance, but rather are used to distinguish one element from another.

Referring to FIG. 1 is a diagram 100 depicting a schematic representation of a cross sectional view of a water tapping device for extracting water from the natural air or humid air in the environment, in accordance with one or more exemplary embodiments. The water tapping device 100 includes a first hemisphere 102, a motor(s) 101, a second hemisphere 104, a cylindrical connector 108, a first concave mirror 114a, and a second concave mirror 114b. The first hemisphere 102 may be a transparent hemisphere. The first hemisphere 102 may be made of transparent material, for example, glass, allowing the sunlight to pass into the device to be reflected by the second concave mirror 114b. The second hemisphere may act as a reservoir 106. The first hemisphere 102 and the second hemisphere 104 may be in an attachable and detachable manner. The first and second hemispheres 102, 104 may be connected to the cylindrical connector 108. The cylindrical connector 108 may include air vents 112 for the air to pass into the device. One end of the cylindrical connector 108 may be connected to the first hemisphere 102 and another end of the cylindrical connector 108 may be connected to the second hemisphere 104 (reservoir 106).

In accordance with one or more exemplary embodiments, the water tapping device 100 further includes a motor(s) 101 connected to photovoltaic cells 103 mounted on the first hemisphere 102. The photovoltaic cells 103 may be designed as the location coordinates latitude and longitude. The photovoltaic cells 103 having photovoltaic strips attached to the first hemisphere 102 from outside. The photovoltaic cells 103 may come in pairs aligned at top and bottom sides. The photovoltaic strips may be exposed to the sun from outside and other side of the photovoltaic strip may be exposed the second concave mirror 114b at a focal length distance. The water tapping device 100 further includes a flange fixed shaft 107, a fixed shaft 109, a rotating planetary gear shaft 113, planetary gears 117, and a bracket 115. The rotating planetary gear shaft 113 and planetary gears 117 may be configured to enable the first rotor 119 and the second rotor 121 to spin in any direction. The bracket 115 may be configured to protect the fixed shaft 109, rotating planetary shaft 113, hollow shaft and the motor 101. The flange fixed shaft 107 and the fixed shaft 109 may be long, the stress may be released after the flange end portion enters the second hemisphere 104, thereby reducing deformation of the second hemisphere 104.

The radius of the first hemisphere 102 may be determined by the first concave mirror 114a focal length plus the mounting distance of the second concave mirror 114b plus the length of the axial rod from the center of the first hemisphere 102 or second hemisphere 104. The second hemisphere 104 may include a provision for inserting electrodes (not shown) from bottom of the device. The electrodes (not shown) may be connected to the power source, such as external power source, for e.g., battery, power supply (AC supply), for initiating electrolysis. The insertions may be sealed off fluid tight once the electrodes (not shown) are removed. The water tapping device 100 also includes a first rotor 119, a second rotor 121, a first rotor blade 123, and a second rotor blade 125. The first and second rotors 119 and 121 may be rotated with the free air movement. The first and second rotor blades 123 and 125 may be aligned to optimize the rotation using the air movement. The first and second rotor blades 123 and 125 may be adjusted manually or automatically to optimize the rotation. The first and second rotor blades 123 and 125 on the first hemisphere 102 may have black and white paint on alternate blades exposed to the sun thus enabling rotation. The second hemisphere 104 may have a lining 111 that may be fortified with the minerals in from of paint or as an alloy lining.

Figure 2:
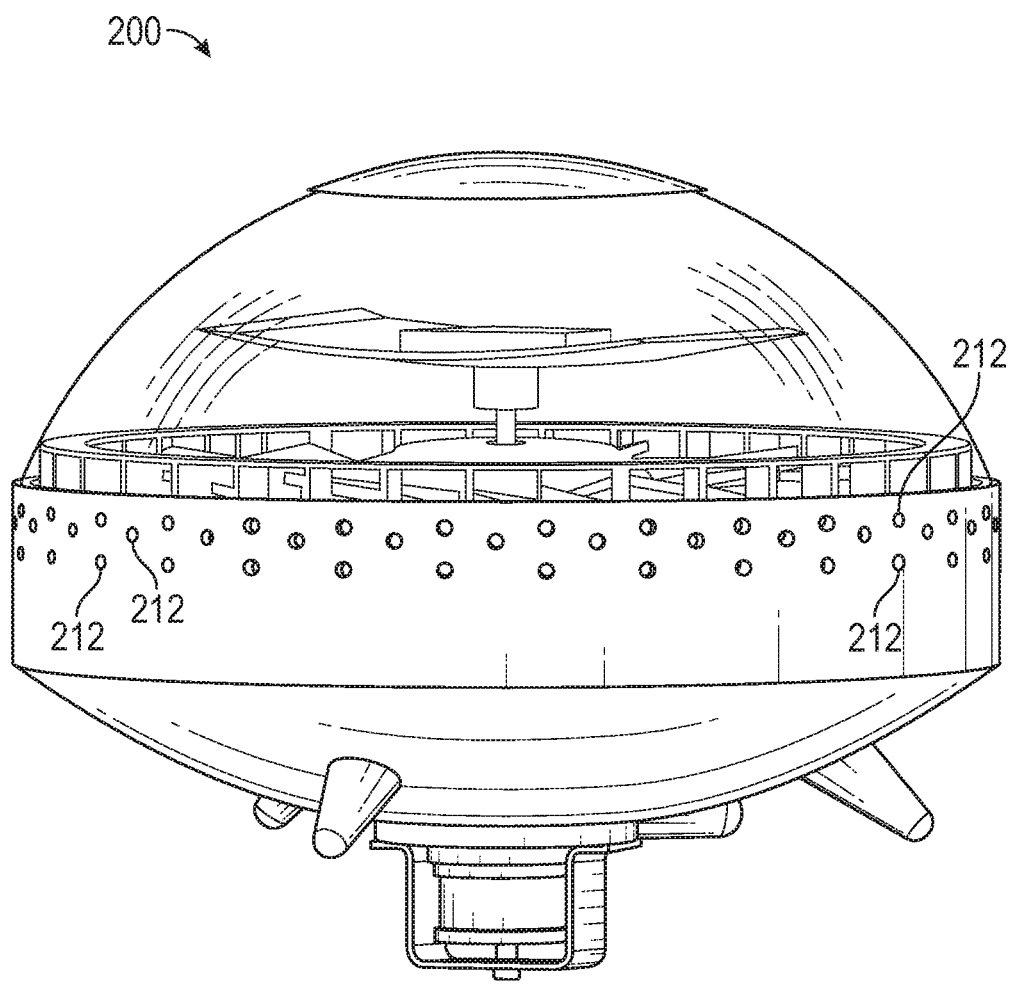
FIG. 2 is a diagram depicting a schematic representation of exemplary view of the water tapping device, in accordance with one or more exemplary embodiments.

Referring to FIG. 2 is a diagram 200 depicting a schematic representation of exemplary view of the water tapping device, in accordance with one or more exemplary embodiments. The water tapping device 200 depicting the air vents 212, for example, circular or elliptical in shape. The air fluid is sucked into the device through the air vents 212 and reaches the cylindrical connector 108 containing the rotors 119, 121 joining the dome as a low-pressure gas. The air vents 212 may be configured to suck and trap the air inside and squeezes the air/fluid, and the molecules in the air/fluid may be packed closer together. The air vents 212 may be made available at the second hemisphere 104 which includes a dual casing that can support electrodes (not shown). The air vents 212 combination may be aligned to the center of the sphere and is positioned such way. The rotors 119, 121 may be positioned in such a way that one rotor would be in the first hemisphere 102 and the other in the second hemisphere 104.

Figure 3:
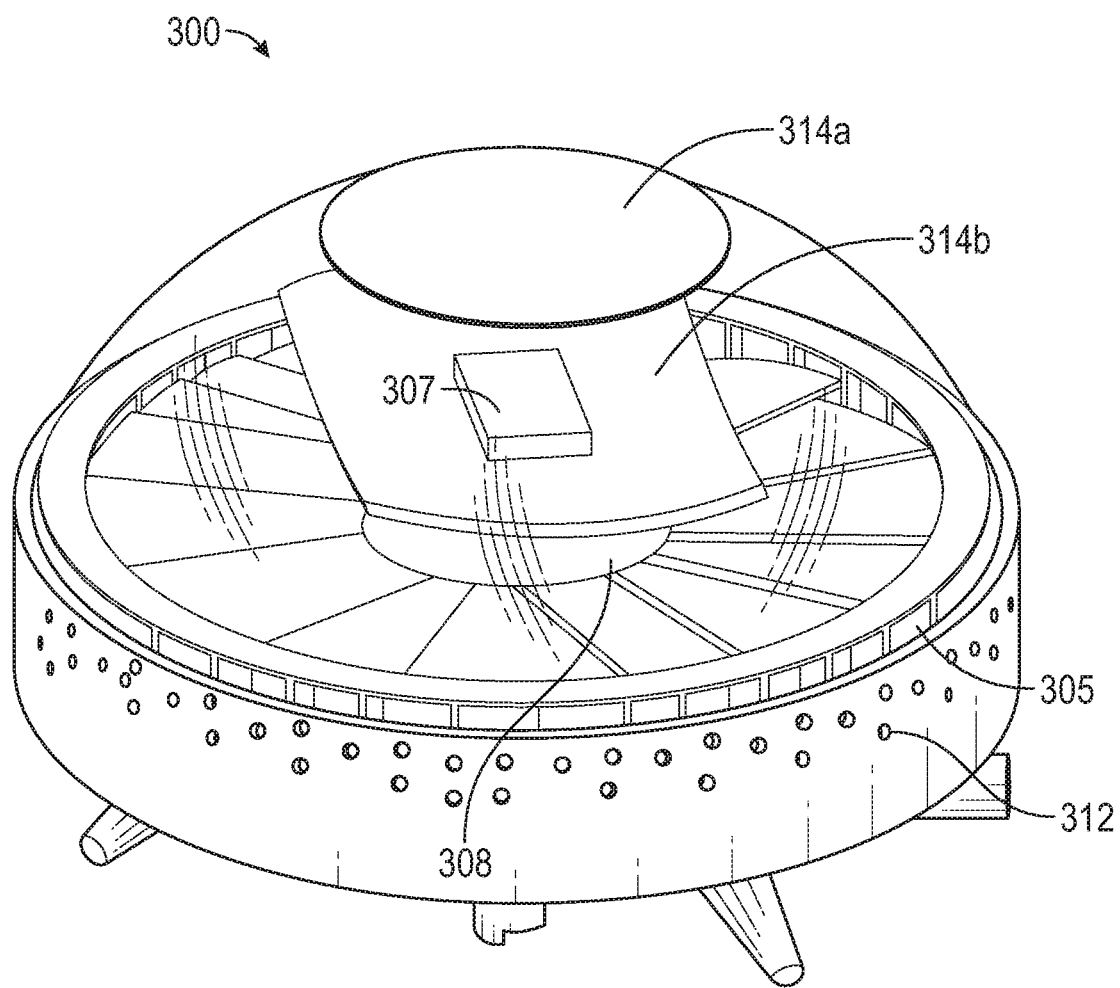
FIG. 3 is a diagram depicting a schematic representation of exemplary view of the water tapping device, in accordance with one or more exemplary embodiments.

Referring to FIG. 3 is a diagram 300 depicting a schematic representation of exemplary view of the water tapping device, in accordance with one or more exemplary embodiments. The water tapping device 300 depicting the first concave mirror 314a, the second concave mirror 314b, the cylindrical connector 308, and lids 305, the air vents 312, and sensors 307. The second concave mirror 314b may be adjusted based on the movement of the sun in the location. The water tapping device 300 may be controlled to be aligned to the Sun using the sensors 307. The sensors 307 may include, but not limited to, a Nano sensor, gyroscopic sensor, solar light tracking sensor, and so forth. The Nano sensor may be configured to measure a quantity or a presence of the air. The gyroscopic sensor may be configured to determine a rotational position of the water tapping device. The solar tracking sensor may be configured to minimize the damage caused by heat generated when the sunlight is collected by a heat radiation plate (not shown) surrounding the outside of the solar tracking sensor.

The air vents 312 may be protected by the lids 305 and it is positioned in the diameter with the assist of pins aligned to the diameter. The pins may be configured to provide the free movement of the lids 305 to certain angle (90 degrees, for e.g.). The lids 305 may be aligned on the surface of the cylindrical connector 308. As the air blows the lids 305 lift up to the certain angle (90 degrees, for e.g.). If the air flowing is absent then the lids 305 may close due to gravity. The lids 305 may include multiple numbers across the circumference of the cylindrical connector 308 in multiple even rows. As the air flow is passed from one direction the opposite lids 305 may be closed allowing the air flow to stay in the device. The top side of the cylindrical connector 308 may be connected to the first hemisphere 102 and the bottom side of the cylindrical connector 308 may be connected to the second hemisphere 104.

Figure 4:
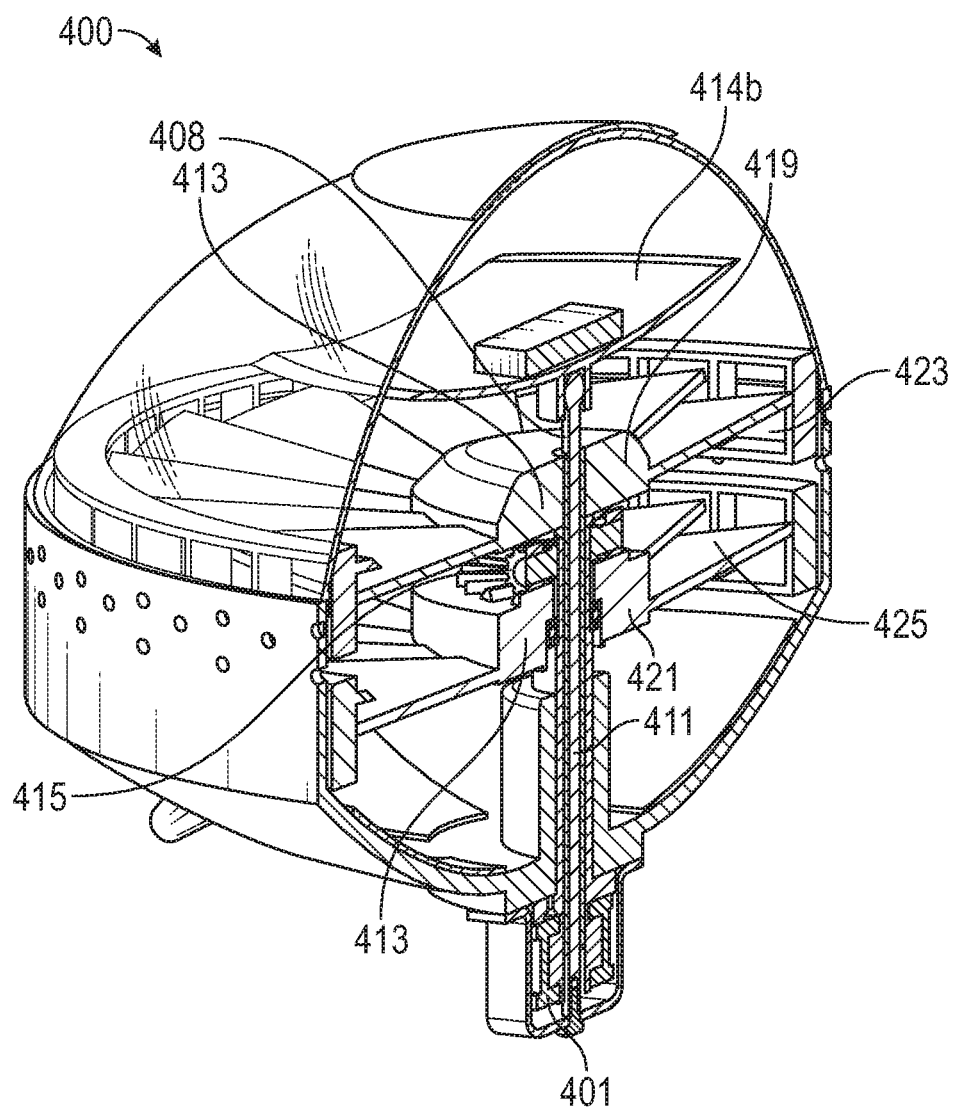
FIG. 4 is a diagram depicting a schematic representation of vertical cross section view of the water tapping device, in accordance with one or more exemplary embodiments.

Referring to FIG. 4 is a diagram 400 depicting a schematic representation of vertical cross section view of the water tapping device, in accordance with one or more exemplary embodiments. The water tapping device 400 depicting a first rotor 419, a second rotor 421, first rotor blades 423, second rotor blades 425, an axial rod 411, mechanical coils 413, the second concave mirror 414b, and gears 415. The first and second rotors 419 and 421 may be molded with different material (plastic material, for e.g.). The second concave mirror 414b may be positioned to one end of the axial rod 411. The first and second rotors 119 and 121 may be aligned on the axial rod 411 (or common axis). The gears 415 may be configured to enable the first and second rotors 419 and 421 to spin in any direction. The axial rod 411 may be hosted in the cylindrical connector 408 that operates like a telescopic cylinders. The gears 415 may be positioned in the cylindrical connector 408. The center of the axial device may have the circular rod connecting the axial rod 411. The first and second rotors 419 and 421 may be rotated with the free air movement. The first rotor blades 423 and the second rotor blades 425 may be aligned to optimize the rotation using the air movement. The first rotor blades 423 and the second rotor blades 425 may be adjusted manually or automatically to optimize the rotation. The axial rod 411 may have the support of motor(s) 401 to aid the rotation in absence of free air flow. The axial rod 411 may be connected to the first and second rotor 419 and 421 and in such case the rotor 419 and 421 and the axial rod 411 would come in pairs acting in any direction. The first and second rotors 419 and 421 on to the axial rod 411 with a ball bearing mechanism and the gears 415. The first and second rotors 419 and 421 may be engaged the gears 415 as the case may be the gears 415 may be mechanical coil based mechanisms. In case of the coil based mechanism then there may be a pressure controller (not shown) configured to control the tension build into the mechanical coil 413 and the tension releases. The pressure controller (not shown) may be configured to control the air pressure and disposing the excess air pressure by using a pressure vent 112/212/312 (air vents).

In accordance with one or more exemplary embodiments, In case of the single axial rod 411, the motor(s) 401 has/have a capability to rotate the first and second rotors 419 and 421 in any direction. The motor(s) 401 may be configured to rotate in a clock wise direction to propel the first and second rotor 419 and 421 in the clock wise direction and anti-clock wise for the other rotor 419 and 421. A single motor 401 and gears 415 may also provide the clockwise and the anti-clockwise motions.

According to an exemplary embodiment of the present disclosure, the water tapping device comprising at least one first hemisphere 102 and at least one second hemisphere 104 are in an attachable and detachable manner.

According to another exemplary embodiment of the present disclosure, the water tapping device comprising at least one first end of at least one cylindrical connector 108/308/408 connected to the at least one first hemisphere 102 and at least one second end of the at least one cylindrical connector 108/308/408 connected to the at least one second hemisphere 104.

According to another exemplary embodiment of the present disclosure, the water tapping device comprising a plurality of air vents 112/212/512 (shown in FIG. 5) configured to suck air fluid and then sucked air fluid reaches the at least one cylindrical connector 108/308/408, whereby the at least one cylindrical connector 108/308/408 comprising at least one first rotor 119/419 and at least one second rotor 121/421 configured to rotate with free air movement, the at least one first rotor 119/419 and the at least one second rotor 121/421 may be aligned on at least axial rod with a ball bearing mechanism and gears 117/415, the gears 117/415/515 (shown in FIG. 5) may be configured to enable the at least one first rotor 119/419 and the at least one second rotor 121/421 to spin in any direction.

According to another exemplary embodiment of the present disclosure, the water tapping device comprising a plurality of first rotor blades 123/423 secured to the at least one first rotor 119/419. The water tapping device also comprising a plurality of second rotor blades 125/425 secured to the at least one second rotor 121/421. The at least one first rotor 119/419 and the at least one second rotor 121/421 are located in the at least one first hemisphere 102 and the at least one second hemisphere 104, the plurality of first rotor blades 123/423 and the plurality of second rotor blades 125/425 are aligned to optimize the rotation using free air movement, the plurality of air vents 112/212/512 (shown in FIG. 5) configured to create air pressure for condensation in the at least one first hemisphere 102 to provide pressurized air and subsequently condense the pressurized air into water in the at least one second hemisphere 104.

According to another exemplary embodiment of the present disclosure, a method for generating power to suck the air and condensing a pressurized air into water, comprising: flowing air through a plurality of air vents 112/212/512 (shown in FIG. 5) in to at least one cylindrical connector 108/308/408, sucking air in to the at least one cylindrical connector 108/308/408 through the plurality of air vents 112/212/512 (shown in FIG. 5) using a plurality of photovoltaic cells 103 and at least one motor 101/401, rotating a plurality of first rotor blades 123/423 and a plurality of second rotor blades 125/425 by the plurality of photovoltaic cells 103, whereby the plurality of photovoltaic cells 103 connected to the at least one motor 101/401, enabling the at least one motor 101/401 for rotating the plurality of first rotor blades 123/423 and the plurality of second rotor blades 125/425, the plurality of first rotor blades 123/423 and the plurality of second rotor blades 125/425 configured to suck the air, the plurality of first rotor blades 123/423 secured to at least one first rotor 119/419 and the plurality of second rotor blades 125/425 secured to at least one second rotor 121/421, whereby the at least one first rotor 119/419 and the at least one second rotor 121/421 in at least one first hemisphere 102 and at least one second hemisphere 104, the plurality of first rotor blades 123/423 and the plurality of second rotor blades 125/425 are aligned to optimize the rotation using free air movement; and creating air pressure by the plurality of air vents 112/212/512 (shown in FIG. 5) for condensation in the at least one first hemisphere to provide pressurized air and subsequently condensing pressurized air into water in the at least one second hemisphere 104.

Figure 5:
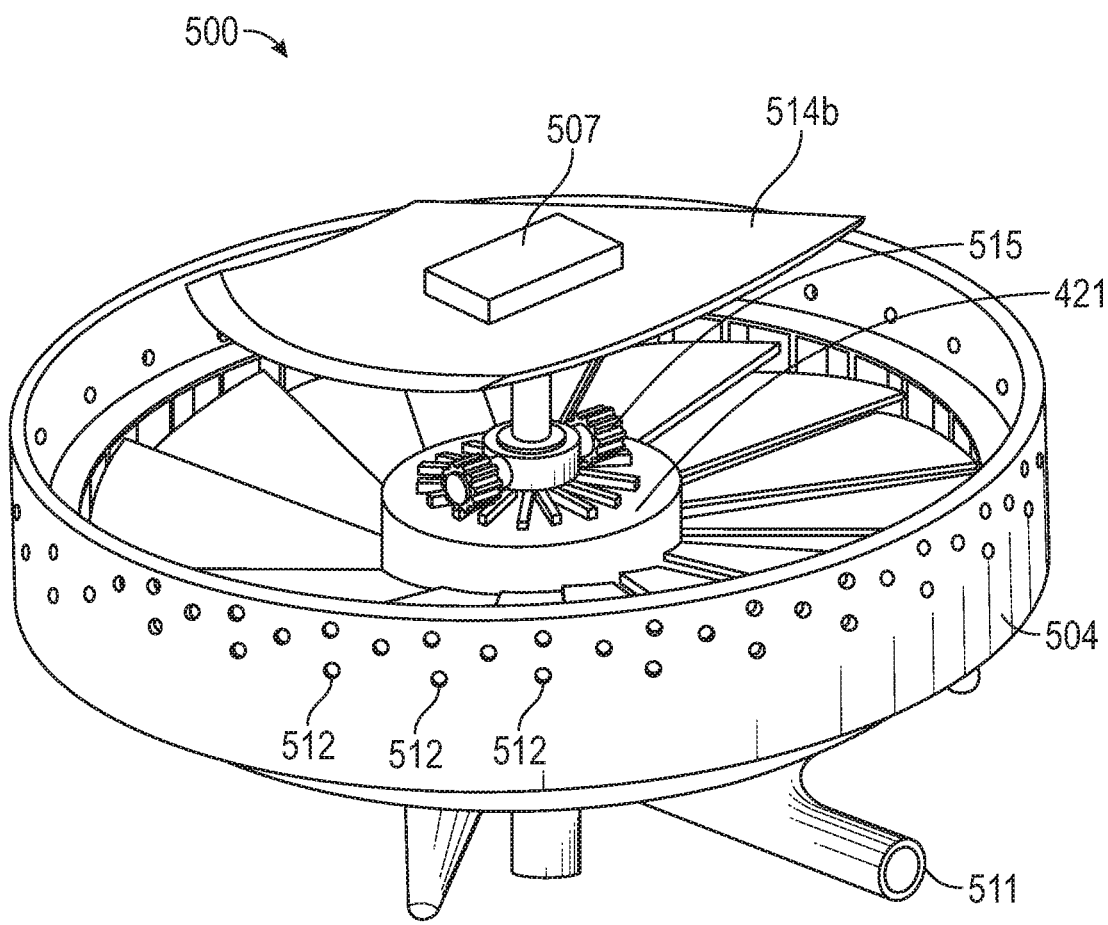
FIG. 5 is a diagram depicting a schematic representation of horizontal cross section view of the water tapping device, in accordance with one or more exemplary embodiments.

Referring to FIG. 5 is a diagram 500 depicting a schematic representation of horizontal cross section view of the water tapping device, in accordance with one or more exemplary embodiments. The water tapping device 500 depicting the outlet valve 511 may be provided at the second hemisphere 504. The outlet valve 511 may be configured for dispensing the water from the reservoir. The water tapping device 500 further depicting the sensors 507, gears 515, the second rotor 421, the second concave mirror 514b, and the second hemisphere 504. The sensors 507 may be attached to the concave mirror 514b. The first and second rotors 419 and 421 may be positioned in such a way that one rotor 419 would be in the first hemisphere 102 and the other rotor 421 in the second hemisphere 504. The first and second rotors 419 and 421 may be configured to spin in any direction and the gears 515 may be configured to enable the first and second rotors 419 and 421 to spin in any direction. The cylindrical connector 108/308/408 may have the air vents 512 for the atmospheric air to pass into the first and second rotors 419, 421 and undergone condensation process to extract water from air. The condensed water or liquid may be collected at the second hemisphere 504 and further the condensed water may undergo for electrolysis process and/or mineralization process (to add minerals). The air may be sucked in to the cylindrical void through the air vents 512. The blocking of the air vents 512 may be detected in the direction of air flow and also necessary pressure may be created for the condensation. If the pressure is building the air vents 512 may be opened to release the air pressure and dispose. In that case, the rotors 419 and 421 may stop so that the fresh air is not sucked inside. If the pressure is too much to control by the manipulation of the air vents 512 in a worst-case situation the excess air pressure may be discharged through the outlet valve 511. Specifically, the plurality of first rotor blades secured to the at least one first rotor and a plurality of second rotor blades secured to the at least one second rotor respectively, whereby the at least one first rotor and the at least one second rotor are located in the at least one first hemisphere and the at least one second hemisphere, and whereby the plurality of first rotor blades and the plurality of second rotor blades are configured to surround or cover the first and second hemispheres completely and aligned to optimize the rotation using free air movement.

Figure 6:
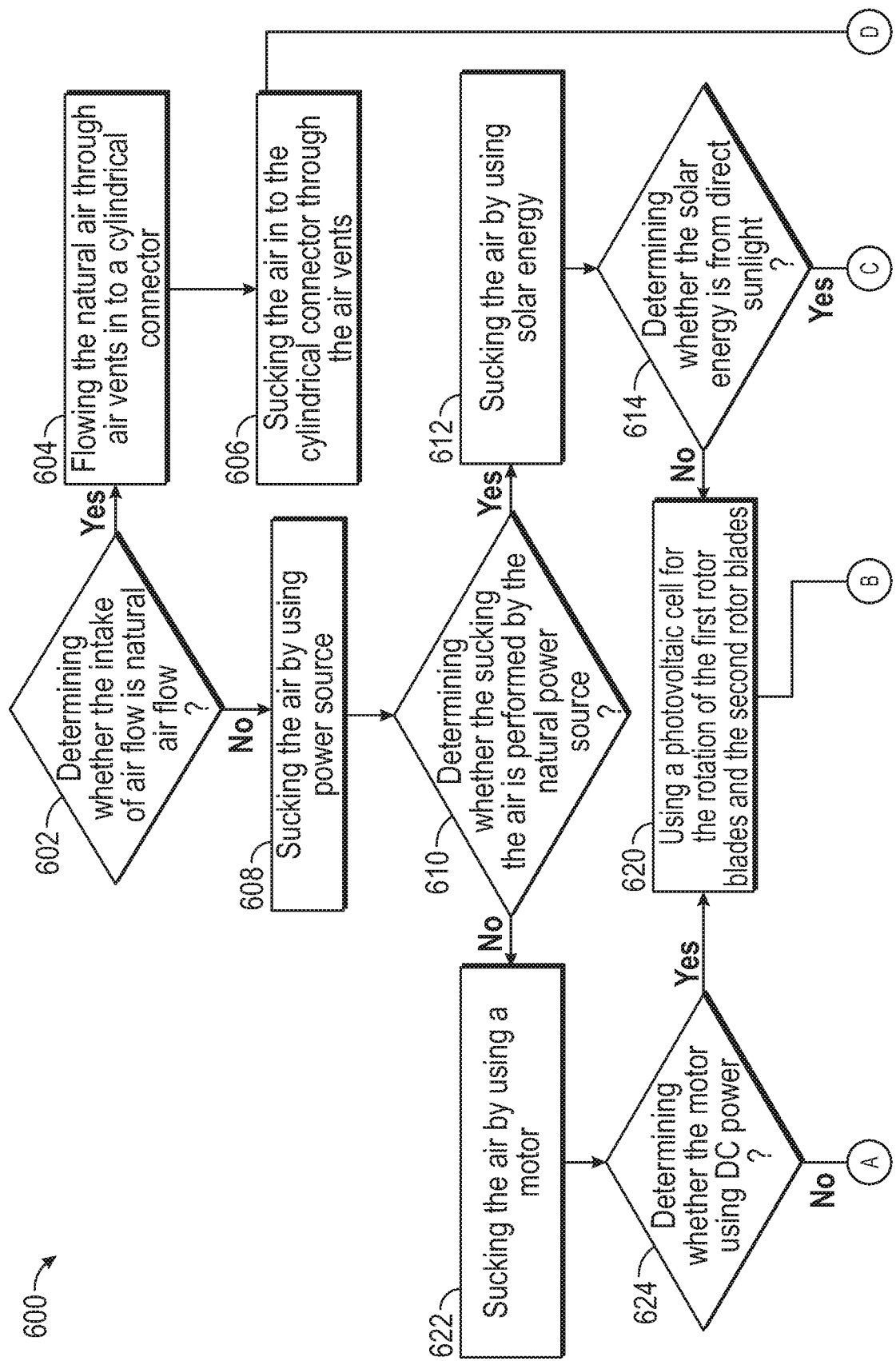
FIG. 6 is a flowchart depicting an exemplary method for generating power to suck the air, in accordance with one or more exemplary embodiments.
Figure 6:
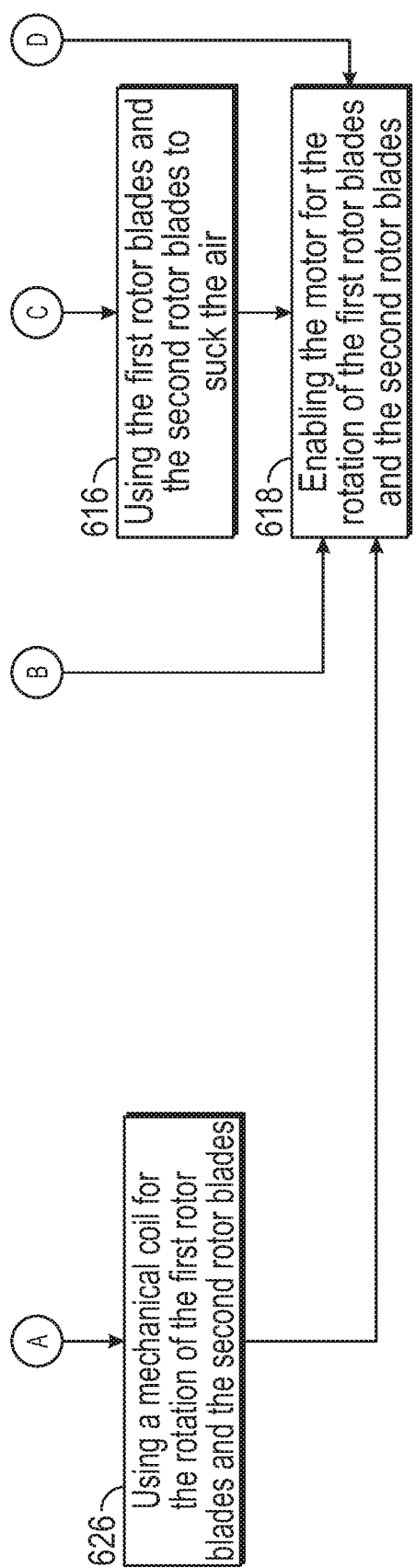

Referring to FIG. 6 is a flowchart 600 depicting an exemplary method for generating power to suck the air, in accordance with one or more exemplary embodiments. As an option, the method 600 is carried out in the context of the details of FIG. 1, FIG. 2 FIG. 3, FIG. 4, and FIG. 5. However, the method 600 is carried out in any desired environment. Further, the aforementioned definitions are equally applied to the description below.

The exemplary method 600 commences at step 602, determining whether the intake of air flow is natural air flow. If the answer to the step 602 is YES, then the method continuous to step 604, flowing the natural air through the air vents in to the cylindrical connector. Sucking the air in to the cylindrical connector through the air vents, at step 606. If the answer to the step 602 is NO, then the method continuous to step 608, sucking the air by using the power source. Determining whether the sucking the air is performed by the natural power source, at step 610. If the answer to the step 610 is YES, then the method continuous to step 612, sucking the air by using solar energy. Determining whether the solar energy is from direct sunlight, at step 614. If the answer to the step 614 is YES, then the method continues to step 616, using the first rotor blades and the second rotor blades to suck the air. Enabling the motor for the rotation of the first rotor blades and the second rotor blades, at step 618. Thereafter at step 618, the method continues to step 606.

If the answer to the step 614 is NO, then the method continues to step 620, using the photovoltaic cell for the rotation of the first rotor blades and the second rotor blades. Thereafter at step 620, the method continues to step 618, enabling the motor for the rotation of the first rotor blades and the second rotor blades. Thereafter at step 618, the method continues to step 606, sucking the air in to the cylindrical connector through the air vents. If the answer to the step 610 is NO, then the method continuous to step 622, sucking the air by using motor. Determining whether the motor using DC power, at step 624. If the answer to the step 624 is YES, then the method continues to step 620, using the photovoltaic cell for the rotation of the first rotor blades and the second rotor blades. Thereafter at step 620, the method continues to step 618, enabling the motor using for the rotation of the first rotor blades and the second rotor blades. Thereafter at step 618, the method continues to step 606, sucking the air in to the cylindrical void through the air vents. If the answer to the step 624 is NO, then the method continues to step 626, using the mechanical coil for the rotation of the first rotor blades and the second rotor blades. Thereafter at step 626, the method continues to step 618, enabling the motor using for the rotation of the first rotor blades and the second rotor blades. Thereafter at step 618, the method continues to step 606, sucking the air in to the cylindrical void through the air vents.

Figure 7:
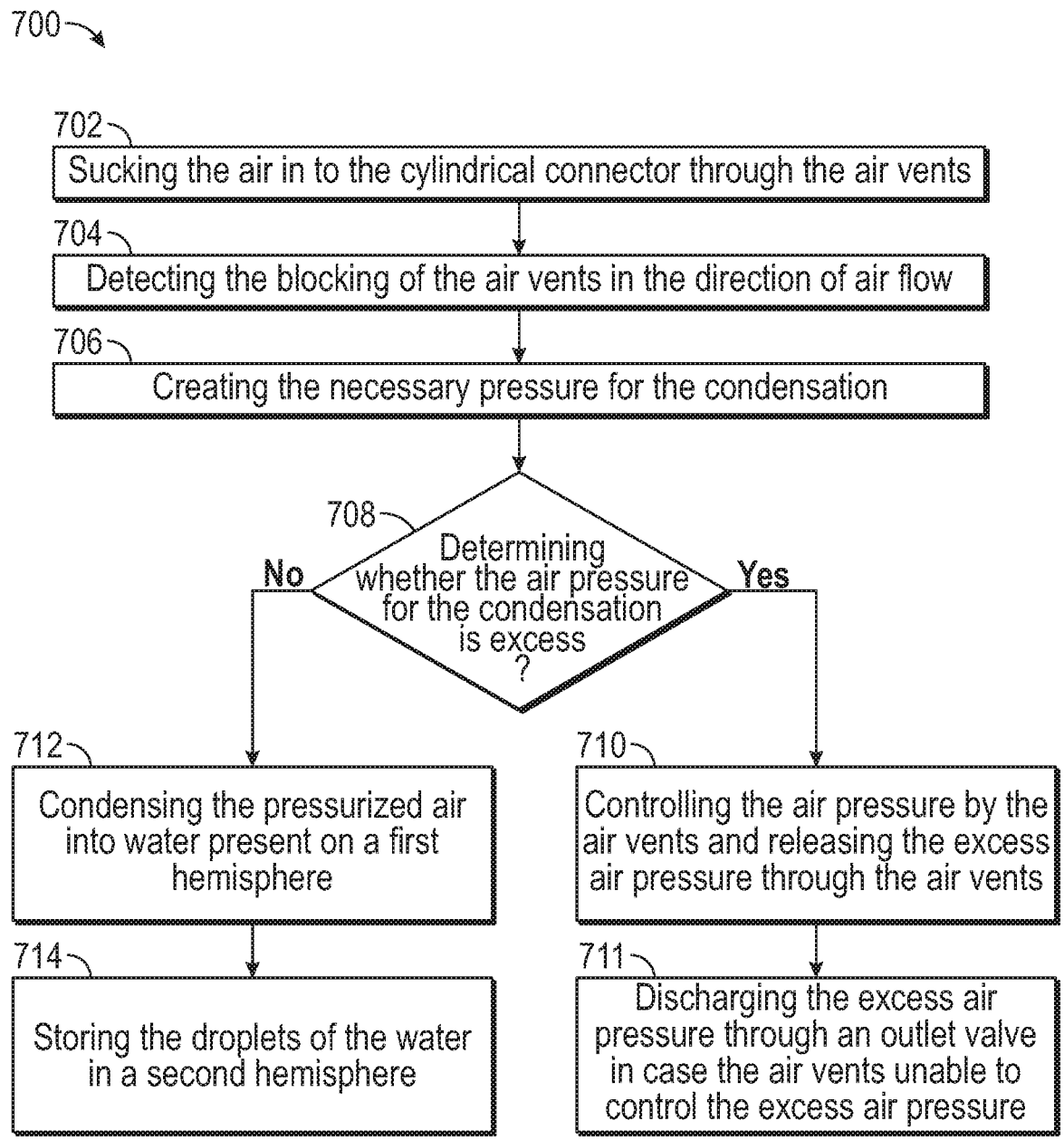
FIG. 7 is a flowchart depicting an exemplary method for condensing the pressurized air into water, in accordance with one or more exemplary embodiments.

Referring to FIG. 7 is a flowchart 700 depicting an exemplary method for condensing the pressurized air into water, in accordance with one or more exemplary embodiments. As an option, the method 700 is carried out in the context of the details of FIG. 1, FIG. 2, FIG. 3, FIG. 4, FIG. 5, and FIG. 6. However, the method 700 is carried out in any desired environment. Further, the aforementioned definitions are equally applied to the description below.

The exemplary method 700 commences at step 702, sucking the air in to the cylindrical void through the air vents. Detecting the blocking of the air vents in the direction of air flow, at step 704. Creating the necessary pressure for the condensation, at step 706. Determining whether the air pressure for the condensation is excess, at step 708. If the answer to the step 708 is YES, then the method continues to step 710, controlling the air pressure by the air vents and releasing the excess air pressure through the air vents. Thereafter, at step 711, discharging the excess air pressure through the outlet valve in case the air vents unable to control the excess air pressure. If the answer to the step 708 is NO, then the method continues to step 712, condensing the pressurized air into water present on the first hemisphere. Storing the droplets of the water in the second hemisphere, at step 714.

Figure 8:
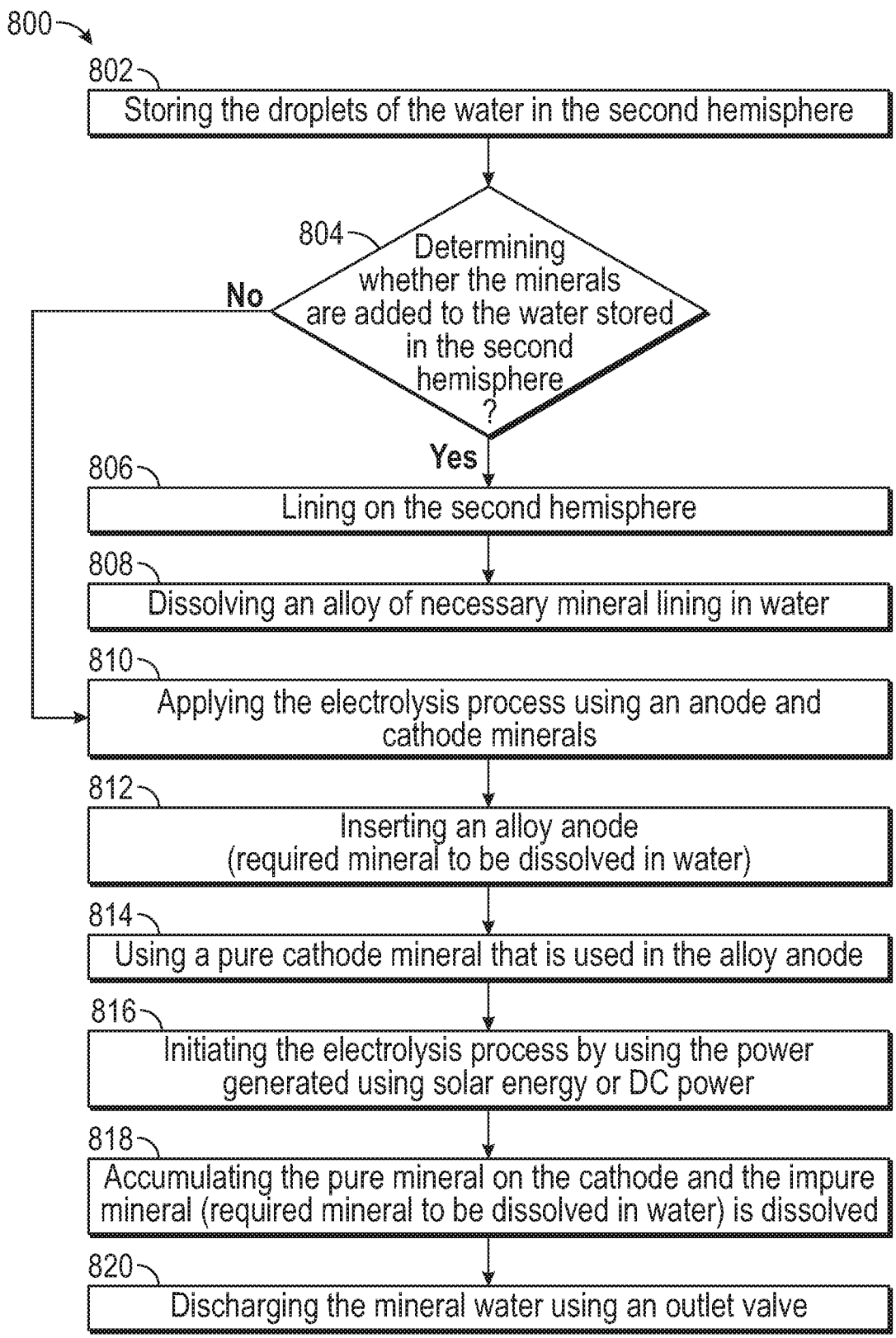
FIG. 8 is a flowchart depicting an exemplary method for electrolysis or process of mineralizing water, in accordance with one or more exemplary embodiments.

Referring to FIG. 8 is a flowchart 800 depicting an exemplary method for electrolysis or process of mineralizing water, in accordance with one or more exemplary embodiments. As an option, the method 800 is carried out in the context of the details of FIG. 1, FIG. 2, FIG. 3, FIG. 4, FIG. 5, FIG. 6, and FIG. 7. However, the method 800 is carried out in any desired environment. Further, the aforementioned definitions are equally applied to the description below.

The exemplary method 800 commences at step 802, storing the droplets of the water in the second hemisphere. Determining whether the minerals are added to the water stored in the second hemisphere, at step 804. If the answer to the step 804 is YES, then the method continues to step 806, lining on the second hemisphere. Dissolving an alloy of necessary mineral lining in water, at step 808. If the answer to the step 804 is NO, then the method continues to step 810, applying the electrolysis process using an anode and cathode minerals. Inserting an alloy anode (required mineral to be dissolved in water), at step 812. Using a pure cathode mineral that is used in the alloy anode, at step 814. Initiating the electrolysis process by using the power generated using solar energy or DC power, at step 816. Accumulating the pure mineral on the cathode and the impure mineral (required mineral to be dissolved in water) is dissolved, at step 818. Discharging the mineral water using an outlet valve, at step 820.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. A water tapping device, comprising:
   at least one first hemisphere and at least one second hemisphere in an attachable and detachable manner;
   at least one first end of at least one cylindrical connector connected to the at least one first hemisphere and at least one second end of the at least one cylindrical connector connected to the at least one second hemisphere;
   a plurality of air vents configured to suck air fluid and then sucked air fluid reaches the at least one cylindrical connector, whereby the at least one cylindrical connector comprising at least one first rotor and at least one second rotor configured to rotate with free air movement, whereby the at least one first rotor and the at least one second rotor aligned on at least one axial rod with a ball bearing mechanism and gears, the gears configured to enable the at least one first rotor and the at least one second rotor to spin in any direction; and
   a plurality of first rotor blades secured to the at least one first rotor and a plurality of second rotor blades secured to the at least one second rotor respectively, whereby the at least one first rotor and the at least one second rotor are located in the at least one first hemisphere and the at least one second hemisphere, and whereby the plurality of first rotor blades and the plurality of second rotor blades are aligned to optimize the internal pressure by rotation using free air movement, the free air movement is an ambient air that enters the at least one first hemisphere through the plurality of air vents, the plurality of air vents configured to create air pressure for condensation in the at least one first hemisphere to provide pressurized air and subsequently condense the pressurized air into water in the at least one second hemisphere.

2. The water tapping device of claim 1, wherein the at least one axial rod comprising at least motor configured to aid the rotation using at least one first rotor and the at least one second rotor in absence of free air flow.

3. The water tapping device of claim 2, wherein the at least one motor is connected to a plurality of photovoltaic cells mounted on the at least one first hemisphere.

4. The water tapping device of claim 1, wherein the plurality of first rotor blades and the plurality of second rotor blades are adjusted manually or automatically to optimize the internal pressure by rotation.

5. The water tapping device of claim 1, wherein the at least one first hemisphere having radius is determined by at least one first concave mirror focal length plus a mounting distance of at least one second concave mirror plus a length of the at least one axial rod from a center of at least one of: the at least one first hemisphere; and the at least one second hemisphere.

6. The water tapping device of claim 5, wherein the at least one second concave mirror is positioned on one end of the at least one axial rod.

7. The water tapping device of claim 5, wherein the at least one second concave mirror is adjusted based on movement of light in a location.

8. The water tapping device of claim 1, wherein the at least one first hemisphere is made of a transparent material configured to allow sunlight, to pass into the plurality of first rotor blades and the plurality of second rotor blades to be reflected by the at least one second concave mirror.

9. The water tapping device of claim 1, wherein the plurality of first rotor blades and the plurality of rotor blades comprising alternative paint exposed to light thus enabling the rotation.

10. The water tapping device of claim 1, wherein the plurality of air vents is configured to suck and trap the air inside creates pressure thus and squeezes the air/fluid, and the molecules in the air/fluid is packed closer together.

11. The water tapping device of claim 1, wherein the plurality of air vents is aligned to a center of a sphere.

12. The water tapping device of claim 1, wherein the plurality of air vents is protected by a plurality of lids.

13. The water tapping device of claim 1, wherein the at least one axial rod is hosted in the at least one cylindrical connector that operates like telescopic cylinders.

14. The water tapping device of claim 1, wherein the at least one second hemisphere comprising at least one outlet valve configured to dispense water.

* * * * *